Aug. 14, 1945.   L. BOUDIN   2,382,379
APPARATUS FOR THE CONTINUOUS PRODUCTION OF CORRUGATED GLASS SHEETS
Filed May 4, 1940   3 Sheets-Sheet 1
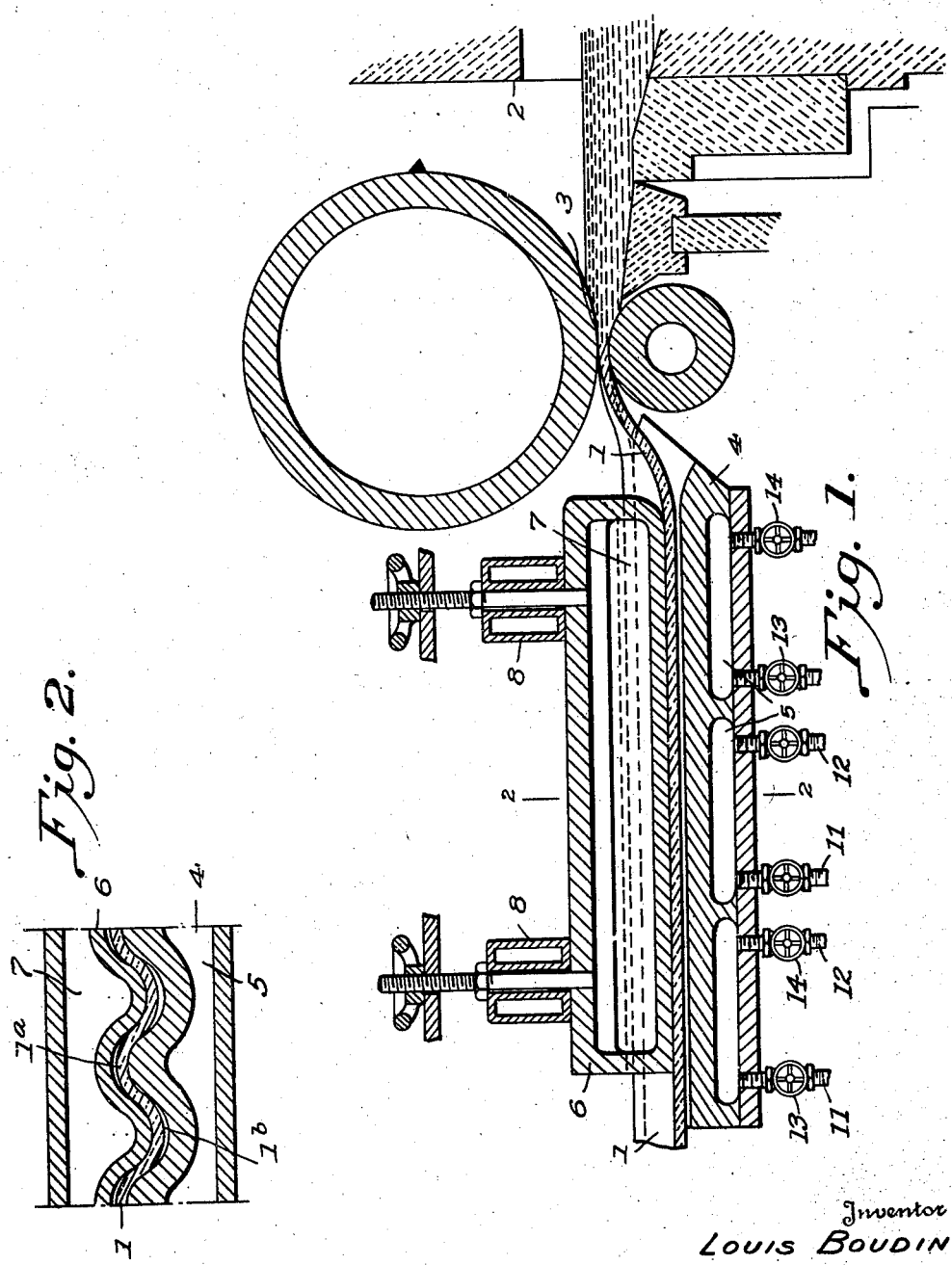

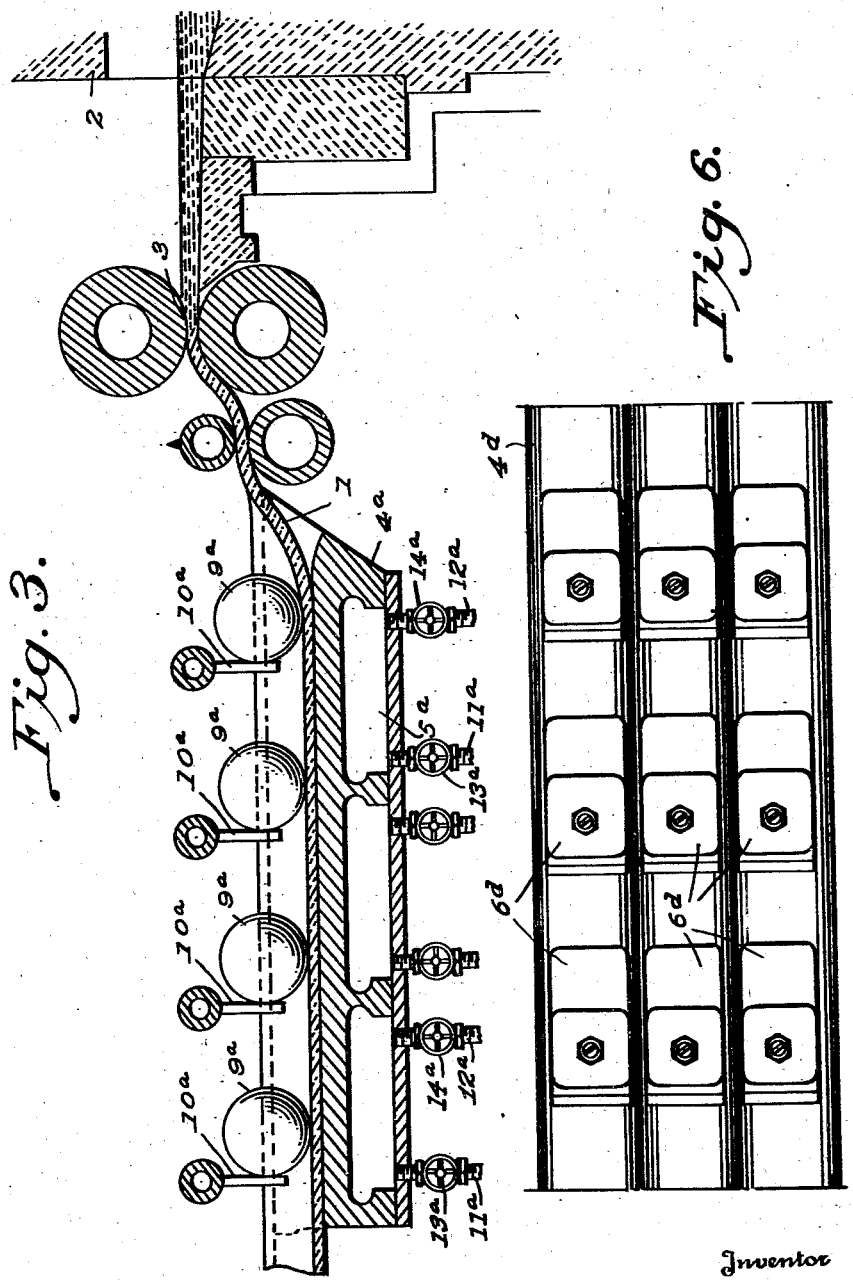

Aug. 14, 1945.  L. BOUDIN  2,382,379
APPARATUS FOR THE CONTINUOUS PRODUCTION OF CORRUGATED GLASS SHEETS
Filed May 4, 1940   3 Sheets-Sheet 3
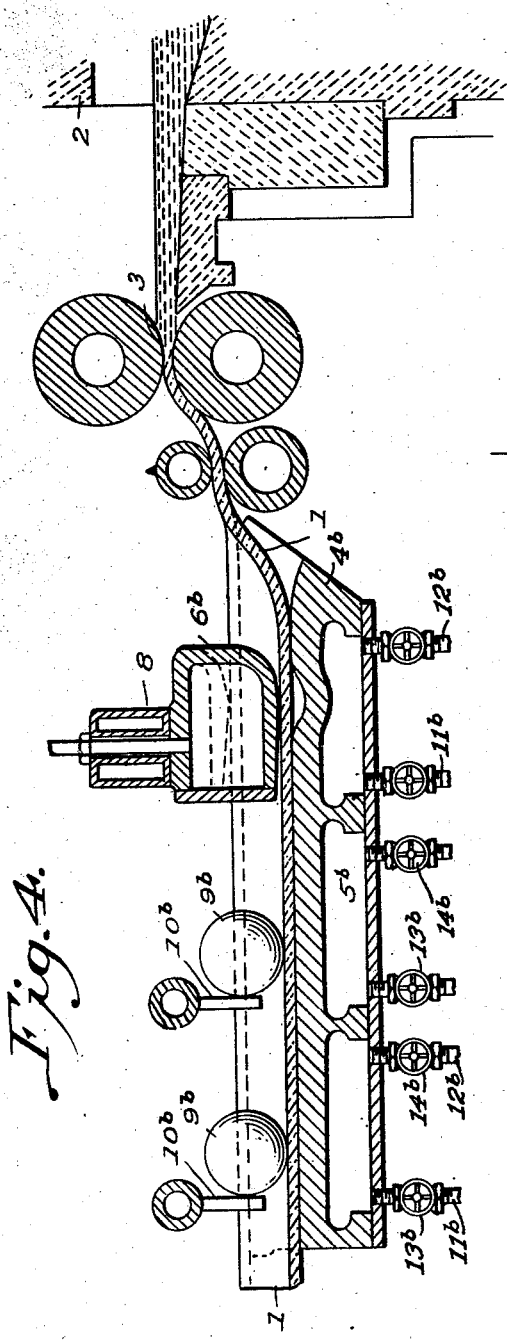
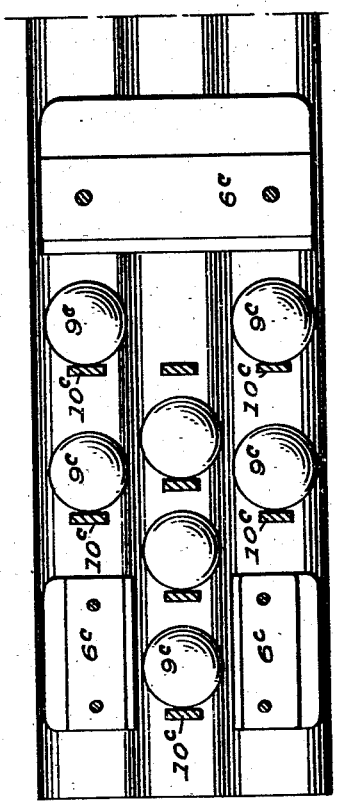
Inventor
LOUIS BOUDIN
By Doney Cole Barner
Attorneys Patented Aug. 14, 1945

2,382,379

UNITED STATES PATENT OFFICE 2,382,379

APPARATUS FOR THE CONTINUOUS PRODUCTION OF CORRUGATED GLASS SHEETS

Louis Boudin, Saint-Gobain, France; vested in the Alien Property Custodian

Application May 4, 1940, Serial No. 333,410
In France May 23, 1939

4 Claims. (Cl. 49—33)

United States Patent No. 2,122,083, issued June 28, 1938, relates to a method of and apparatus for the continuous manufacture of corrugated glass sheets, which may be reinforced or not, the production of which consists in passing a continuous sheet over a fixed shaping member which is corrugated transversely. The continuous sheet is preliminarily flat, and at the moment it comes in contact with the shaping member it has a temperature sufficiently high, and is thus sufficiently plastic, to assume the corrugated form of the shaping member by reason of its own weight.

The above mentioned patent describes various means for complementing the action of the weight of the sheet, particularly for the parts of the sheet designed to form the lower parts of the corrugations, and for this purpose there are provided counter-shaping members acting on the top of the sheet and forcing it to come in contact with all parts of the shaping member, and particularly the lowermost parts thereof. In one embodiment specifically disclosed in this patent the counter-shaper is disposed to act only on the bottoms of the corrugations.

After its passage over the shaping plate the corrugated sheet is carried by rollers of the ordinary type, generally cylindrical, on which it is carried into an annealing oven and cooled to the surrounding temperature. The arrangement is such that the time of the passage of the sheet over the shaping member is of sufficient duration so that the same will not come in contact with the rollers before having acquired sufficient rigidity to exclude the danger of its becoming deformed when it is deprived of the support of the shaping member. In order to provide the required duration of passage necessary to obtaining hardening, that is, sufficient cooling, of the sheet, the shaping member is thus given a certain length, chiefly in the interval which, on the shaping member, separates the point at which the sheet receives the desired corrugated form, and the exit from the shaping member. It has been found in practice, particularly in the case of reinforced or wire glass, that during this interval the corrugated sheet may run the risk of deformation, due particularly to the fact that this sheet, which is not yet hard, is subject to traction through entraining or conveying members acting on the cold part of the previously formed sheet.

The present application consists in providing a means suitable for maintaining the form of the sheet constant during its passage over the shaping member, particularly from the moment in which it has received the desired corrugated form.

One embodiment of the present invention consists in disposing above the shaping member and the sheet a counter-member exerting action over a great length of the sheet to a point where it has become practically rigid. As this prolonged action tends to increase the friction between the sheet and the fixed parts, the shaping member and the counter-member do not contact with the sheet at points opposite each other, so that the shaping member and counter-member do not exert simultaneous action on the same points of the glass and thus do not, by combining their action, risk wedging or jamming the sheet. These two members may each have a transverse profile or cross sectional form which is constant from the entrance to the exit, but in this case the profile of the one is combined or arranged with that of the other so that the upper semi-corrugations of the sheet in one transverse section are separated from the counter-member and are in contact with the shaping member, while the lower semi-corrugations are, on the other hand, separated from the shaping member and in contact with the counter-member.

In the drawings illustrating the features of the invention, Fig. 1 is a vertical longitudinal section of one embodiment of the invention;

Fig. 2 is a partial transverse section along line 2—2 of Fig. 1;

Fig. 3 is a vertical longitudinal section of another embodiment of the invention;

Fig. 4 is a vertical longitudinal section of a third embodiment of the invention, and Fig. 5 is a plan view of a variation of the embodiment of the invention illustrated in Fig. 4.

Fig. 6 is a plan view showing a modification of the invention and illustrates the use of a plurality of individual counter-molds or elements in conjunction with the shaping member.

In Figs. 1 and 2 of the accompanying drawings is shown an embodiment of the invention by way of example. The continuous glass sheet 1, obtained in known manner, by passage of the glass from a furnace 2 in a rolling mill 3, passes over the shaping member 4. The latter consists of a metal table the upper part of which is formed of corrugations having a general direction parallel with the direction in which the sheet moves. This table is provided with one or more chambers 5 in which water is circulated by means of inlet pipes 11 and outlet pipes 12 and control valves 13 and 14, respectively to regulate the temperature.

Disposed above this table is a counter-mold 6 which is integral with supports 8, with which the height may be varied and which is provided preferably with one or more chambers 7 in which water is circulated. This counter-mold comprises corrugations parallel with the direction in which the sheet moves and the pitch of which is equal to that of the corrugations of the shaping member, which latter are arranged with respect to those of the shaping member as shown in Fig. 2. As seen in this figure the upper semi-corrugations or ridges 1a of the sheet are in contact with the shaping member 4 and removed from the counter-member. The lower semi-corrugations or grooves 1b of the sheet, on the contrary, are in contact with the counter-mold 6 and removed from the shaping member. Through the action thereby exerted on the lower semi-corrugations, the counter-mold holds the upper semi-corrugations in contact with the corresponding parts of the shaping member, and vice versa, the action of the shaping member on the upper semi-corrugations is sufficient to hold the lower semi-corrugations of the sheet in contact with the corresponding parts of the counter-mold. The result is that the combined action of the two members is suitable for maintaining the profile of the sheet constant. However, the shaping member and the counter-mold must be so arranged that they do not act as a drawing die and that the glass sheet does not fill the whole space therebetween in order not to create an excessive amount of friction, which would necessitate an excessive pulling force to overcome this friction. Such a pulling would tend to make the glass sheet thinner, and in the case of reinforced glass would operate to alter the shape of the wire mesh. By arranging the corrugations in the shaping member and the counter-mold so that these make alternate contacts with the opposite faces of the sheet, a gentle gradual forming action is realized without occasioning large frictional resistance requiring strong pulling forces, as in the case of a drawing die.

In the embodiment shown in Figs. 1 and 2 the counter-mold extends over the greater portion of the length of the shaping member and assures the retention of the profile during the greater part of the passage of the sheet.

According to modifications of this arrangement the counter-mold, constructed like that described and embodied in its whole for the entire extent of the shaping member, may, however, be composed of a plurality of separate or individual elements 6d cooperating with the shaping table 4d as shown in Figure 6 disposed either successively or side by side accordingly as the counter-mold may be subdivided longitudinally or transversely relative to the advance of the sheet. These different elements may be adjusted individually.

According to another embodiment of the invention the glass sheet is subject to the action of balls resting on the sheet, rotating freely on themselves and acting in the bottom of the corrugations. Fig. 3 shows such a construction. The balls are shown at 9a and their travel with the sheet is prevented by the abutments 10a. These balls act on the sheet by their own weight and hold it in contact with the bottom of the corrugations or grooves of the shaping member 4a. The shaping member is provided with one or more chambers 5a for the circulation of a cooling fluid introduced by means of inlet pipes 11a, outlet pipes 12a and control valves 13a and 14a, respectively. These balls may have a radius approximating that of the corrugations of the shaping member, so as to exert their action over a large portion of the grooves of the sheet.

It is to be noted that the balls act independently of each other and can thus describe rotational movements different from each other. This is of advantage in cases in which all point of the sheet do not move at the same rate of speed or, for example, where the shaping member, as a result of unequal expansion, has certain local deformations or warping or where the sheet itself presents differences of temperatures from one longitudinal line to another and the sheet does not cool in the same manner from one point to another of each cross-sectional line thereof.

According to the invention it is also possible to combine the counter-mold with balls. Use may be made, for example, of an arrangement such as that shown in Fig. 4, in which the glass sheet is first subjected to the action of a counter-mold 6b, then to the action of balls 9b controlled by abutments 10b. Instead of this arrangement the sheet may first pass under balls then under a counter-mold. The shaping table 4b is provided with one or more chambers 5b for the introduction of a cooling medium through inlet pipes 11b, outlet pipes 12b and control valves 13b and 14b, respectively.

Counter-molds may also be combined with balls so that the arrangement differs from one corrugation to the next. This arrangement permits particularly of taking into account any differences of temperature or consistency of the sheet from one corrugation to the other. Fig. 5 shows such a construction by way of example. In this arrangement, the glass sheet is first subjected to the action of a counter-mold 6c, then to a series of aligned balls 9c, fitted with abutments 10c, as shown in Figs. 3 and 4. Following these molding stages, each of the outside grooves is subjected to action of a ball 9c and a counter-mold 6c while the inner groove is subjected to the action of only the balls 9c.

*Summary*

The means herein disclosed are adapted to hold the profile of the glass sheet constant during its passage over the shaping member and are characterized specifically by the following features, separately or in combination:

(a) A counter-mold which exerts its action over a great length of the sheet and practically until it passes from the shaping member, is disposed above the shaping member and the sheet.

(b) The shaping member and the counter-mold associated therewith each have a constant transverse profile, but that of the one is associated with that of the other so that, in the same cross section, the upper semi-corrugations of the sheet are removed from the counter-mold and in contact with the shaping member while the lower semi-corrugations are removed from the shaping member and in contact with the counter-mold.

(c) The counter-mold is formed of a plurality of different, individually regulable, elements.

(d) The sheet is held on the shaping member by balls resting on the sheet and rotating freely on themselves, the travel of said balls with said sheet being prevented by means such as abutments (stops, etc.) for example.

(e) According to a modification counter-molds are combined with balls.

Having thus described my invention, what I claim is:

1. An apparatus for the continuous production of corrugated glass comprising a melting tank provided with an outlet end, means for withdrawing continuously a sheet of glass therefrom in substantially flat form, a stationary shaping element provided with a corrugated glass-receiving surface arranged to receive said sheet of glass and shape the same, means for applying pressure to the glass sheet to force it to conform to the corrugated surface of the shaping element comprising a plurality of revoluble spherical members, and means for restraining said members against lineal travel in the grooves of said corrugated surface, said members being of a size corresponding to that of said grooves.

2. An apparatus for the continuous production of corrugated glass comprising a melting tank provided with an outlet end, means for withdrawing continuously a sheet of glass therefrom in substantially flat form, a stationary shaping element provided with a corrugated glass-receiving surface arranged to receive said sheet of glass and shape the same, and means for applying pressure to the glass sheet to force it to conform to the corrugated surface of the shaping element comprising a plurality of revoluble spherical members resting in the grooves of said corrugations and fixed abutments adjacent thereto for arresting the lineal travel of said spherical members while permitting the free revolving movements thereof.

3. An apparatus as set forth in claim 2, wherein is provided a corrugated counter-mold located above said shaping element and displaced from said spherical members for supplementing the molding action of the spherical members.

4. An apparatus as set forth in claim 2, wherein a plurality of corrugated counter-molds of different widths are disposed above said shaping element and along different lengths and widths thereof to obtain desired molding effects in conjunction with the spherical members.

LOUIS BOUDIN.